United States Patent
Cho

(10) Patent No.: US 12,234,359 B2
(45) Date of Patent: Feb. 25, 2025

(54) PLASTIC COMPOSITE RESIN COMPOSITION, A METHOD OF MANUFACTURING A PLASTIC MOLDED ARTICLE, AND A PLASTIC MOLDED ARTICLE FOR RADAR ABSORPTION MANUFACTURED USING THE METHOD

(71) Applicants: HYUNDAI MOTOR COMPANY, Seoul (KR); KIA CORPORATION, Seoul (KR)

(72) Inventor: Byung Kyu Cho, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 412 days.

(21) Appl. No.: 17/522,753

(22) Filed: Nov. 9, 2021

(65) Prior Publication Data
US 2022/0363897 A1    Nov. 17, 2022

(30) Foreign Application Priority Data
May 14, 2021   (KR) .................. 10-2021-0062551

(51) Int. Cl.
*C08J 9/08*  (2006.01)
*C08L 77/02* (2006.01)

(52) U.S. Cl.
CPC ................ *C08L 77/02* (2013.01); *C08J 9/08* (2013.01); *C08J 2203/02* (2013.01); *C08J 2377/02* (2013.01); *C08J 2423/04* (2013.01)

(58) Field of Classification Search
CPC ... C08J 9/0076; C08J 9/008; C08J 9/08; C08J 2203/02; C08J 2377/02; C08J 2423/04; C08K 3/041; C08K 9/12; C08L 77/00; C08L 77/02
See application file for complete search history.

(56) References Cited

FOREIGN PATENT DOCUMENTS

| | | | | |
|---|---|---|---|---|
| JP | 2002506105 A | * | 2/2002 | |
| KR | 20190114809 A | | 10/2019 | |
| WO | WO-2016133207 A1 | * | 8/2016 | ........... C01B 32/174 |

* cited by examiner

*Primary Examiner* — John M Cooney
(74) *Attorney, Agent, or Firm* — Lempia Summerfield Katz LLC

(57) ABSTRACT

The present disclosure relates to a plastic composite resin composition, a method of manufacturing a plastic molded article using the same, and a plastic molded article for radar absorption manufactured using the method. More particularly, the present disclosure provides a method of improving a radar absorption rate by manufacturing a plastic molded article having pores formed therein using a plastic resin including polyamide, a filler including carbon nanotubes, and a foaming agent.

3 Claims, 3 Drawing Sheets

PLASTIC COMPOSITE RESIN COMPOSITION, A METHOD OF MANUFACTURING A PLASTIC MOLDED ARTICLE, AND A PLASTIC MOLDED ARTICLE FOR RADAR ABSORPTION MANUFACTURED USING THE METHOD

CROSS REFERENCE TO RELATED APPLICATION

The present application claims priority to and the benefit of Korean Patent Application No. 10-2021-0062551, filed May 14, 2021, the entire contents of which is incorporated herein for all purposes by this reference.

BACKGROUND

1. Field of the Disclosure

The present disclosure relates to a plastic composite resin composition, a method of manufacturing a plastic molded article using the same, and a plastic molded article for radar absorption manufactured using the method. More particularly, the present disclosure provides a method of improving a radar absorption rate by manufacturing a plastic molded article having pores formed therein using a plastic resin including polyamide, a filler including carbon nanotubes, and a foaming agent.

2. Description of the Related Art

Vehicles are equipped with electronic control devices that electronically control various devices to receive information from sensors or switches installed in the vehicles and to process the received information, thereby performing control functions to improve safety and steering feel of the vehicles. A radar device that senses the distance between surrounding objects and vehicles by transmitting electromagnetic waves and receiving the reflected electromagnetic waves is useful therein. In particular, in the radar device, the function of an absorber part that directly absorbs the reflected and received electromagnetic waves may be considered to be very important.

Specifically, a radar absorber may be used for at least two purposes. For the first purpose, the absorber mounted on the outer part of the radar device absorbs noise reflected from the vehicle wheel/back beam/road surface during the radiation of radar, thus preventing false detection. The absorber used for the second purpose is located in an inside of an EMI shield to absorb noise emitted from a RF chip that oscillates electromagnetic waves, thus helping a radar beam pattern to be formed in a desired shape, and thereby ensuring the reliability of radar detection performance.

Conventionally, as such an absorber material, a polybutylene terephthalate (PBT) plastic material is widely used with a carbon fiber (CF) filler. However, the absorber material is very expensive. Further, since a very large amount of filler is used to increase the absorption performance, there is a drawback in that the defect rate is very high when the radar device is assembled due to a lot of deformation during manufacture.

Korean Laid-Open Patent Application No. 10-2019-0114809 relates to a radar device, and provides a radar device that is capable of reducing noise in a low frequency region and also reducing manufacturing costs using plastics, carbon fibers, and carbon nanotubes. However, there is still a problem in that the radar device does not provide the desired radar absorption rate.

SUMMARY

An objective of the present disclosure is to provide a method of manufacturing a plastic for improving radar wave absorption performance.

Another objective of the present disclosure is to provide a plastic resin composition for reducing production costs while maintaining a high radar wave absorption performance.

Another objective of the present disclosure is to provide a plastic molded article for radar wave absorption having maximum dimensional stability.

The objective of the present disclosure is not limited to the above-mentioned objective. The objective of the present disclosure should become more apparent from the following description, and is realized by the means described in the claims and combinations thereof.

According to the present disclosure, there is provided a plastic composite resin composition including a plastic composite resin including a plastic resin and a filler. The plastic resin includes polyamide.

The filler may include carbon nanotubes.

The plastic composite resin may include 97 to 99 wt % of the plastic resin and 1 to 3 wt % of the filler.

The plastic composite resin composition may further include a foaming agent.

The foaming agent may include a foaming material containing sodium hydrogen carbonate.

The foaming material may be contained in any one carrier selected from the group consisting of low-density polyethylene (LDPE), polyethylene (PE), polypropylene (PP), and a combination thereof.

The foaming agent may be included in an amount of 2 to 4 parts by weight based on 100 parts by weight of a plastic composite resin.

According to the present disclosure, there is provided a method of manufacturing a plastic molded article for radar absorption. The method includes preparing the plastic composite resin, adding a foaming agent to the plastic composite resin, followed by mixing and injection, thus forming a molded article, and manufacturing a foaming molded article by performing foaming using the foaming agent.

The foaming agent may include a foaming material containing sodium hydrogen carbonate and may be added in an amount of 2 to 4 parts by weight based on 100 parts by weight of the plastic composite resin.

The manufacturing of the foaming molded article may include performing foaming using the foaming agent to form pores in the molded article.

A volume of the pores may be 10 to 50% of a total volume of the foaming molded article.

The pores may have a long axis length of 0.3 to 1.0 mm.

According to the present disclosure, there is provided a plastic molded article for radar absorption manufactured using the above manufacturing method.

The plastic molded article may include pores, and the pores may be included in a volume of 10 to 50% based on a volume of the plastic molded article.

A radar absorption rate (%) of the plastic molded article may be 60% or more.

According to the present disclosure, a method is provided for manufacturing a plastic for improving radar wave absorption performance.

According to the present disclosure, a plastic resin composition is provided for reducing production costs while maintaining a high radar wave absorption performance.

According to the present disclosure, a plastic molded article is provided for radar wave absorption having maximum dimensional stability.

The effects of the present disclosure are not limited to the above-mentioned effects. It should be understood that the effects of the present disclosure include all effects that can be inferred from the following description.

BRIEF DESCRIPTION OF THE DRAWINGS

The above and other objectives, features, and advantages of the present disclosure should be more clearly understood from the following detailed description taken in conjunction with the accompanying drawings, in which.

DESCRIPTION OF THE EMBODIMENTS

Figure 1:
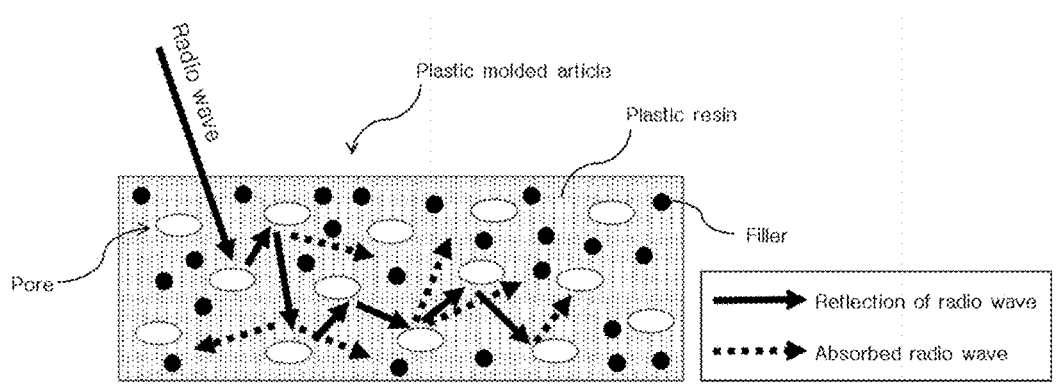
FIG. 1 shows a plastic molded article of the present disclosure.

The above objectives, other objectives, features, and advantages of the present disclosure should be understood through the following embodiments related to the accompanying drawings. However, the present disclosure is not limited to the embodiments described herein and may be embodied in other forms. Rather, the embodiments introduced herein are provided so that the disclosed content may be thorough and complete, and the spirit of the present disclosure may be sufficiently conveyed to those having ordinary skill in the art.

In the present specification, it is to be understood that terms such as "include" or "have" are intended to designate the presence of features, numbers, steps, actions, elements, parts, or combinations thereof described in the specification, but do not preclude the possibility of the presence or addition of one or more other features, numbers, steps, actions, elements, parts, or combinations thereof. Further, when a part such as a layer, a film, a region, and a plate is said to be "on" another part, this includes cases where one part is "directly on" the other part, as well as cases where there is another part therebetween. Conversely, when a part such as a layer, a film, a region, and a plate is said to be "under" another part, this includes cases where one part is "directly under" the other part, as well as cases where there is another part therebetween.

Unless otherwise specified, all numbers, values, and/or expressions expressing ingredients, reaction conditions, polymer compositions, and quantities of formulations used in the present specification are approximations that reflect the various uncertainties in the measurement inherently occurring in obtaining these values among others. Accordingly, it should be understood as being modified in all cases by the term "about". Further, when numerical ranges are disclosed herein, such ranges are continuous and, unless otherwise indicated, include all values from the minimum to the maximum values within the ranges. Moreover, when such ranges refer to an integer, all integers including the minimum to the maximum values are included therein, unless otherwise indicated.

In the present specification, when a range is described for a variable, it should be understood that the variable includes all values within the stated range, including the stated endpoints of the range. For example, it should be understood that a range of "5 to 10" includes values of 5, 6, 7, 8, 9, and 10, as well as any sub-ranges such as 6 to 10, 7 to 10, 6 to 9, and 7 to 9, and also includes any values between integers that are reasonable in the scope of the stated range, such as 5.5, 6.5, 7.5, 5.5 to 8.5, and 6.5 to 9. Further, for example, it should be understood that a range of "10% to 30%" includes values such as 10%, 11%, 12%, and 13%, all integers up to 30%, any sub-ranges such as 10% to 15%, 12% to 18%, and 20% to 30%, and any values between integers that are reasonable in the scope of the stated range, such as 10.5%, 15.5%, and 25.5%.

The present disclosure relates to a plastic composite resin composition, a method of manufacturing a plastic molded article using the same, and a plastic molded article for radar absorption manufactured using the method.

Plastic Composite Resin Composition

The plastic composite resin composition of the present disclosure includes a plastic composite resin including a plastic resin and a filler.

The plastic resin includes polyethylene, polypropylene, polystyrene, polyalkylene terephthalate, polyamide, polyacetal, polycarbonate, polysulfone, polyimide, or a combination thereof. In one example, the plastic resin includes any one selected from the group consisting of polyethylene, polypropylene, polystyrene, polyalkylene terephthalate, polyamide, polyacetal, polycarbonate, polysulfone, polyimide, and a combination thereof. In another example, the plastic resin includes any one selected from the group consisting of polyamide, polybutylene terephthalate, and a combination thereof. In yet another example, the plastic resin may include polyamide, which induces even dispersion of the foaming agent, and thereby, pores having a small size are evenly distributed in the molded article manufactured.

The filler may include carbon fibers or any one of carbon fibers and carbon nanotubes, but may include carbon nanotubes.

The plastic composite resin may include 97 to 99 wt % of a plastic resin and 1 to 3 wt % of a filler.

In one example, the plastic composite resin composition of the present disclosure further includes a foaming agent.

The foaming agent includes a foaming material containing sodium hydrogen carbonate. In one example, the foaming material may be low-density polyethylene (LDPE), polyethylene (PE), polypropylene (PP), or a combination thereof. In another example, the foaming material may be contained in any one carrier selected from the group consisting of low-density polyethylene (LDPE), polyethylene (PE), polypropylene (PP), and a combination thereof. In yet another example, the carrier may include polyethylene.

In one example, the foaming agent is included in an amount of 2 to 4 parts by weight based on 100 parts by weight of the plastic composite resin.

Method of Manufacturing Plastic Molded Article for Radar Absorption

A method of manufacturing a plastic molded article for radar absorption of the present disclosure includes preparing the plastic composite resin of the present disclosure, adding a foaming agent to the plastic composite resin, followed by mixing and injection, thus forming a molded article, and manufacturing a foaming molded article by performing foaming using the foaming agent.

Preparation Step

The plastic composite resin of the present disclosure may include the plastic resin and the filler.

The plastic resin may include polyamide, and the plastic composite resin of the present disclosure may include 97 to 99 wt % of the plastic resin.

The filler may include carbon nanotubes, and the plastic composite resin of the present disclosure may include 1 to 3 wt % of the filler.

Step of Forming Molded Article

In this step, the foaming agent is added to the prepared plastic composite resin, mixed, and injection-molded to manufacture the molded article.

The foaming agent includes a foaming material containing sodium hydrogen carbonate. In one example, the foaming agent may be included in an amount of 2 to 4 parts by weight based on 100 parts by weight of the plastic composite resin.

The plastic composite resin and the foaming agent are mixed with each other to evenly disperse the foaming agent in the plastic composite resin. The plastic composite resin in which the foaming agent is dispersed is injected, thus forming a molded article having a desired shape.

In the present disclosure, the mixing environment and the injection environment of the plastic composite resin and the foaming agent are not particularly limited.

Step of Manufacturing Foaming Molded Article

In this step, foaming is performed using the foaming agent included in the injected molded article to manufacture the foaming molded article. More specifically, in this step, the foaming is performed using the foaming agent to form pores in the molded article.

A volume of the pores is, in one example, 10 to 50% of the total volume of the foaming molded article. In another example, the pores are included in a volume of 12 to 35% of the total volume of the foaming molded article.

The volume of the pores may depend on the temperature and speed at which the plastic composite resin is injected.

The long axis length of the pore may be, in one example, 0.3 to 1.0 mm, and, in another example, may be 0.3 to 0.55 mm. When the long axis length of the pore is 0.3 mm or less, the pore interface with which the radio wave will come into contact becomes small, so that the absorption effect may be reduced.

Plastic Molded Article for Radar Absorption

The plastic molded article for radar absorption of the present disclosure may include a plastic resin and a filler.

The plastic resin includes polyethylene, polypropylene, polystyrene, polyalkylene terephthalate, polyamide, polyacetal, polycarbonate, polysulfone, polyimide, or a combination thereof. In one example, the plastic resin includes any one selected from the group consisting of polyethylene, polypropylene, polystyrene, polyalkylene terephthalate, polyamide, polyacetal, polycarbonate, polysulfone, polyimide, and a combination thereof. In another example, the plastic resin includes any one selected from the group consisting of polybutylene terephthalate, polyamide, and a combination thereof. In yet another example, the plastic resin may include polyamide, which induces even dispersion of the foaming agent, and thereby, pores having a small size are evenly distributed in the molded article manufactured.

The filler may include carbon fibers or any one of carbon fibers and carbon nanotubes, but may include carbon nanotubes to improve absorption performance and secure dimensional stability.

The plastic molded article manufactured using the method of manufacturing the plastic molded article for radar absorption of the present disclosure may include pores. The space of the pores contains air. The dielectric constant ($\varepsilon$) of the pores is lower than that of the plastic resin, so refraction or reflection of radio waves occurs at the interface.

FIG. 1 shows the plastic molded article of the present disclosure and the predicted path of absorbed radio waves. Referring to this, the pores are evenly distributed in small sizes in the plastic molded article to thus reflect the absorbed radio waves multiple times at the interfaces between the pores and the plastic resin, resulting in a longer radio wave travel path. Accordingly, it can be understood that the radio waves are additionally absorbed as multiple reflections of the radio waves occur. When there are no pores or when the pores are not evenly formed in the plastic resin, it can be expected that some of the radio waves absorbed on the inside of the molded article will escape out of the molded article with a single reflection.

In the present disclosure, a high absorption rate may be obtained and the filler content may be minimized using the pores.

The pores may be included in a volume of 10 to 50% based on the plastic molded article. In one example, the pores are included in a volume of 12 to 35% based on the total volume of the plastic molded article. When the volume of the pores is 10% or less, radar absorption performance is reduced, and when the volume is more than 50%, wrinkles and sinks may be formed on the surface of the molded article due to the excessive pores formed therein.

Further, the long axis length of the pore may be 0.3 to 1.0 mm and, in one example, may be 0.3 to 0.55 mm. When the long axis length of the pore is 0.3 mm or less, the pore interface with which the radio waves will come into contact becomes small, so the absorption effect may be reduced.

The absorption rate of the plastic molded article for radar absorption manufactured in the present disclosure may be 60% or more.

Hereinafter, the present disclosure is described in more detail through examples. However, these examples are for illustrative purposes only, and the scope of the present disclosure is not limited thereto.

Examples and Comparative Examples

Specimens were manufactured using the plastic composite resin compositions of the contents of Tables 1 and 2 below. As the foaming agent, sodium hydrogen carbonate with a polyethylene (PE) carrier that does not generate harmful gases was used.

TABLE 1

| | | Example 1 | Example 2 | Example 3 | Example 4 | Example 5 | Example 6 | Example 7 | Example 8 |
|---|---|---|---|---|---|---|---|---|---|
| Plastic resin | PBT (wt %) | X | X | X | X | X | X | X | X |
| | PA6 (wt %) | 99 | 97 | 97 | 97 | 97 | 97 | 97 | 97 |
| Filler | CNT (wt %) | 1 | 3 | 3 | 3 | 3 | 3 | 3 | 3 |
| | CF (wt %) | X | X | X | X | X | X | X | X |

TABLE 1-continued

|  |  | Example 1 | Example 2 | Example 3 | Example 4 | Example 5 | Example 6 | Example 7 | Example 8 |
|---|---|---|---|---|---|---|---|---|---|
| Foaming agent* | Content (parts by weight*) | 2 | 2 | 3 | 4 | 2 | 2 | 2 | 2 |
|  | Volume (%) | 20 | 20 | 20 | 20 | 15 | 29 | 20 | 20 |
|  | Long axis length (mm) | 0.4 | 0.4 | 0.4 | 0.4 | 0.4 | 0.4 | 0.35 | 0.55 |

*Foaming agent = Sodium hydrogen carbonate contained in PE carrier
*Parts by weight = Relative content based on 100 parts by weight of the total weight of plastic resin and filler

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Plastic resin | PBT (wt %) | 60 | X | X | X | X | X | X | X |
|  | PA6 (wt %) | X | 97 | 97 | 100 | 94 | 97 | 97 | 97 |
| Filler | CNT (wt %) | X | 3 | 3 | X | 6 | 3 | 3 | 3 |
|  | CF (wt %) | 40 | X | X | X | X | X | X | X |
| Foaming agent* | Content (parts by weight*) | X | X | 5 | X | 2 | 2 | 2 | 2 |
|  | Volume (%) | X | X | 20 | X | 20 | 9 | 60 | 20 |
|  | Long axis length (mm) | X | X | 0.4 | X | 0.4 | 0.4 | 0.4 | 0.2 |

*Foaming agent = Sodium hydrogen carbonate contained in PE carrier
*Parts by weight = Relative content based on 100 parts by weight of the total weight of plastic resin and filler Experiment Results Radar transmittance/absorption rate/reflexibility evaluation and warpage evaluation were performed on the specimens manufactured in Examples 1-8 and Comparative Examples 1-8. The results are shown in Tables 3 and 4 below.

TABLE 3

|  |  | Example 1 | Example 2 | Example 3 | Example 4 | Example 5 | Example 6 | Example 7 | Example 8 |
|---|---|---|---|---|---|---|---|---|---|
| Plastic resin | PBT (wt %) | X | X | X | X | X | X | X | X |
|  | PA6 (wt %) | 99 | 97 | 97 | 97 | 97 | 97 | 97 | 97 |
| Filler | CNT (wt %) | 1 | 3 | 3 | 3 | 3 | 3 | 3 | 3 |
|  | CF (wt %) | X | X | X | X | X | X | X | X |
| Foaming agent* | Content (parts by weight*) | 2 | 2 | 3 | 4 | 2 | 2 | 2 | 2 |
|  | Volume (%) | 25 | 25 | 25 | 25 | 15 | 29 | 25 | 25 |
|  | Long axis length (mm) | 0.4 | 0.4 | 0.4 | 0.4 | 0.4 | 0.4 | 0.35 | 0.55 |
| Appearance measurement |  | Favorable | Favorable | Favorable | Favorable | Favorable | Favorable | Favorable | Favorable |
| Pore measurement |  | Occurrence | Occurrence | Occurrence | Occurrence | Occurrence | Occurrence | Occurrence | Occurrence |
| Absorption rate (%) |  | 62 | 63 | 63 | 64 | 62 | 65 | 63 | 63 |
| Reflexibility (%) |  | 38 | 37 | 37 | 36 | 38 | 35 | 37 | 37 |
| Transmittance (%) |  | 0.01% or less | 0.01% or less | 0.01% or less | 0.01% or less | 0.01% or less | 0.01% or less | 0.01% or less | 0.01% or less |
| Warpage evaluation (mm) |  | 0.18 | 0.18 | 0.17 | 0.16 | 0.18 | 0.18 | 0.18 | 0.18 |

*Appearance measurement = Observation of the appearance deformation of a specimen with the naked eye

*Pore measurement = Observation of pore formation by cutting the cross section of the specimen (case where the area of pores formed is 80% or more is considered 'non-occurrence')

*Transmittance/absorption rate/reflexibility measurement method = A vector network analyzer device is used to generate electromagnetic waves, and a signal of the electromagnetic wave radiated from a transmission unit is received by a receiver antenna to measure the transmittance, reflexibility, and absorption rate. An electromagnetic wave frequency band is adjusted to 76 to 77 GHz.

*Warpage measurement method = A laser scan is radiated on the upper end of the specimen, and the degree of warpage of the specimen is evaluated using the delta values of the high and low points of a Z axis.

TABLE 4

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Plastic resin | PBT (wt %) | 60 | X | X | X | X | X | 97 | X |
| | PA6 (wt %) | X | 97 | 97 | 100 | 94 | 97 | X | 97 |
| Filler | CNT (wt %) | X | 3 | 3 | X | 6 | 3 | 3 | 3 |
| | CF (wt %) | 40 | X | X | X | X | X | X | X |
| Foaming agent* | Content (parts by weight*) | X | X | 5 | X | 2 | 1 | 2 | 2 |
| | Volume (%) | X | X | 53 | X | 10 | 9 | 20 | 20 |
| | Long axis length (mm) | X | X | 0.4 | X | 0.4 | 0.4 | 0.4 | 0.2 |
| Appearance measurement | | Favorable | Favorable | Defect (occurrence of sink) | Favorable | Favorable | Favorable | Favorable | Favorable |
| Pore measurement | | Non-occurrence | Non-occurrence | Occurrence | Non-occurrence | Occurrence | Occurrence | Non-occurrence | Occurrence |
| Absorption rate (%) | | 12 | 45 | 65 | 10 | 58 | 56 | 11 | 50 |
| Reflexibility (%) | | 88 | 55 | 35 | 90 | 42 | 44 | 89 | 50 |
| Transmittance (%) | | 0.01% or less | 0.01% or less | 0.01% or less | 0.01% or less | 0.01% or less | 0.01% or less | 0.01% or less | 0.01% or less |
| Warpage evaluation (mm) | | 0.55 | 0.35 | 0.15 | 0.12 | 0.20 | 0.20 | 0.15 | 0.15 |

*Appearance measurement = Observation of the appearance deformation of a specimen with the naked eye
*Pore measurement = Observation of pore formation by cutting the cross section of the specimen (case where the area of pores formed is 80% or more is considered 'non-occurrence')
*Transmittance/absorption rate/reflexibility measurement method = A vector network analyzer device is used to generate electromagnetic waves, and a signal of the electromagnetic wave radiated from a transmission unit is received by a receiver antenna to measure the transmittance, reflexibility, and absorption rate. An electromagnetic wave frequency band is adjusted to 76 to 77 GHz.
*Warpage measurement method = A laser scan is radiated on the upper end of the specimen, and the degree of warpage of the specimen is evaluated by checking the high and low points of a Z axis.

Figure 2:
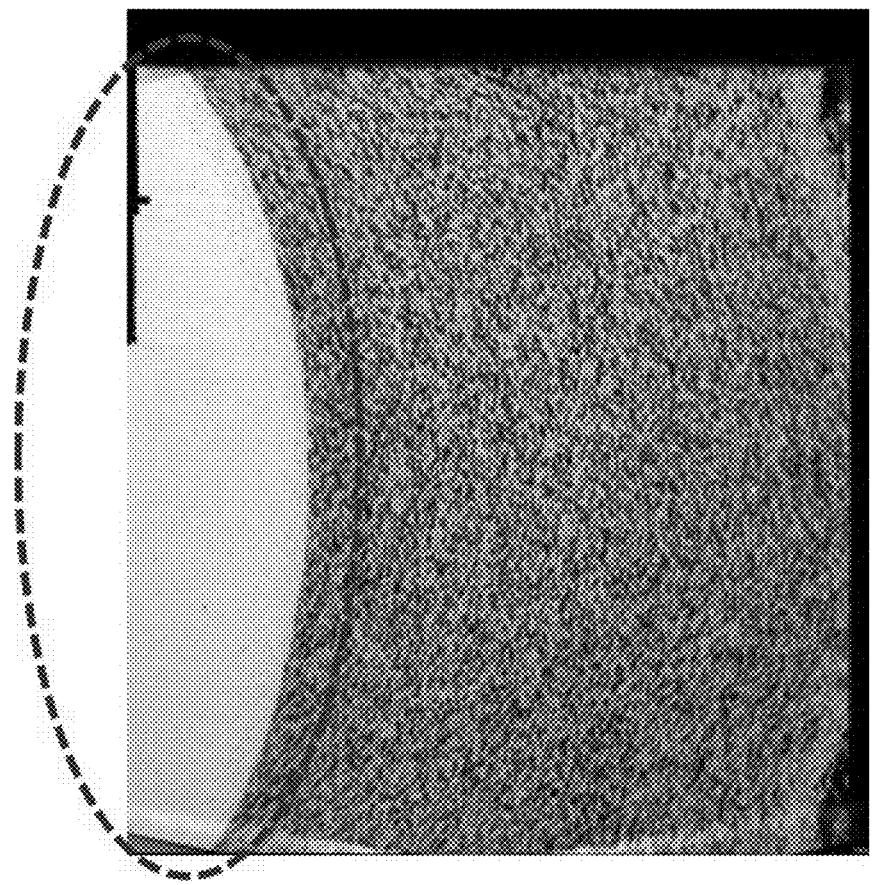
FIG. 2 is obtained by observing a cross section of a specimen of Comparative Example 7.

When PBT is used as the plastic resin, it can be confirmed that the absorption rate is very low and that almost no pores are formed through Comparative Examples 1 and 7. FIG. 2 shows an observation of whether pores are formed through a cross-section of the specimen of Comparative Example 7. Referring to FIG. 2, it can be confirmed that no pores are formed in the area within the dotted line. Through this, it can be expected that the foaming agent is evenly dispersed when PA6 is used as the plastic resin and, as a result, the pores are uniformly formed.

Figure 3:
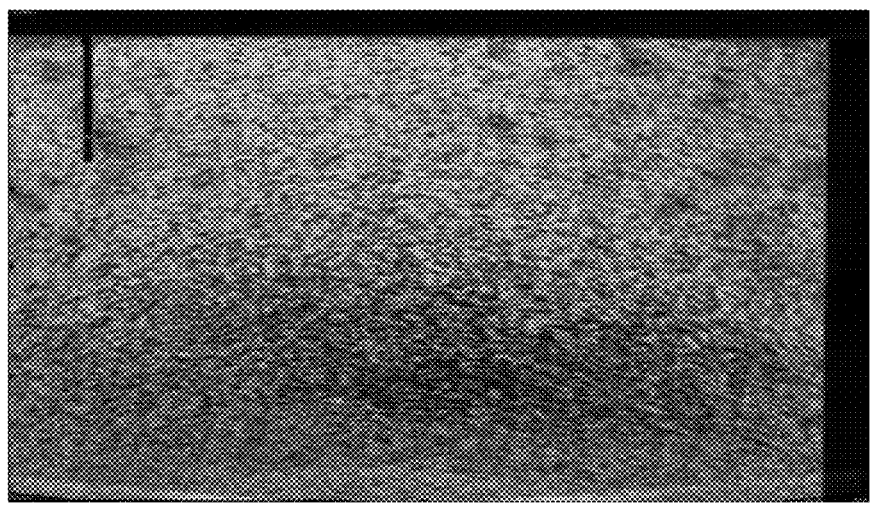
FIG. 3 is obtained by observing a cross section of a specimen of Example 2.

FIG. 3 shows an observation of whether pores are formed through a cross-section of the specimen of Example 2. Referring to FIG. 3, it can be confirmed that the pores are evenly distributed as a whole.

In general, it can be seen that the absorption rate is very low compared to the absorption rate of the Examples in the case of a specimen in which almost no pores are formed or a specimen in which no pores are formed because the foaming agent is not used. In particular, when the foaming agent is used and the volume of pores is less than 20%, it can be confirmed that the absorption rate does not exceed 60%. However, when the pore volume is excessively large, it can be confirmed that the absorption rate may be increased but the appearance of the specimen deteriorates and a sink occurs.

Further, even when the long axis length of the formed pore is short, it can be confirmed that the contact interface of radio waves is relatively reduced, so the absorption rate is reduced.

In the case of the warpage evaluation of the specimen, it can be confirmed that the values of the Comparative Examples in which the pores are not formed or are not evenly formed are much larger compared to the values of the Examples in which the pores are evenly formed. Through this, it can be expected that the dimensional stability of the specimen is improved when the pores are evenly formed.

Although the embodiments of the present disclosure have been disclosed for illustrative purposes, those having ordinary skill in the art should appreciate that various modifications, additions and substitutions are possible, without departing from the scope and spirit of the disclosure as disclosed in the accompanying claims.

What is claimed is:

1. A method of manufacturing a plastic molded article for radar absorption, the method comprising:
    preparing a plastic composite resin composition comprising a plastic resin and a filler, wherein the plastic resin comprises polyamide;
    adding a foaming agent to the plastic composite resin, followed by mixing and injection molding, thus forming a molded article; and
    manufacturing a foaming molded article by performing foaming using the foaming agent to form pores in the molded article,
    wherein the pores have a long axis length of 0.3 to 1.0 mm.

2. The method of claim 1, wherein the foaming agent comprises a foaming material containing sodium hydrogen carbonate and is added in an amount of 2 to 4 parts by weight based on 100 parts by weight of the plastic composite resin.

3. The method of claim 1, wherein the foaming molded article has a pore volume fraction of 10 to 50% with respect to the total volume thereof.

* * * * *